Sept. 27, 1966    A. SANCIONI    3,275,340
FIFTH WHEEL SAFETY DEVICE
Filed Dec. 3, 1964    2 Sheets-Sheet 1
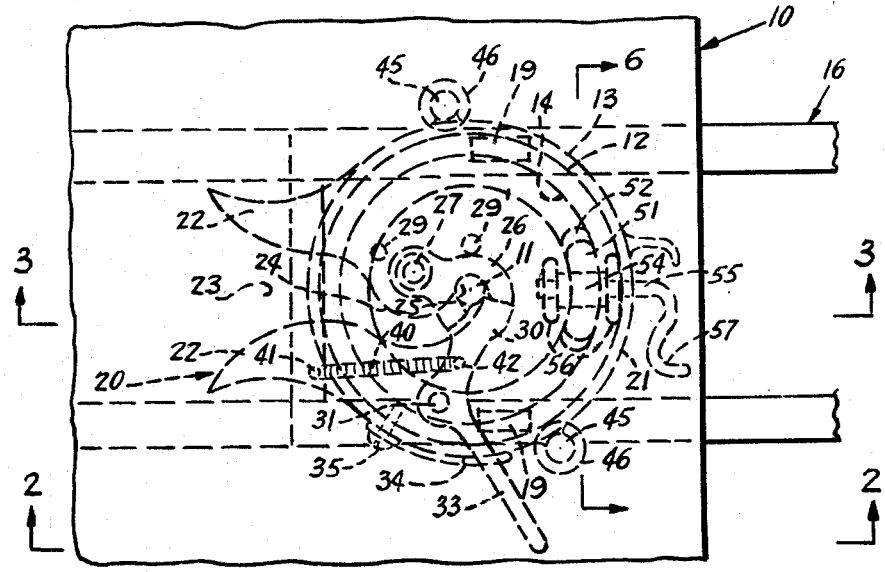
FIG.1
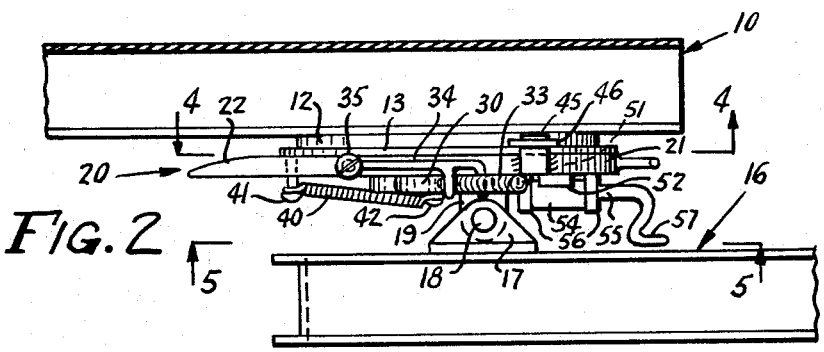
FIG.2
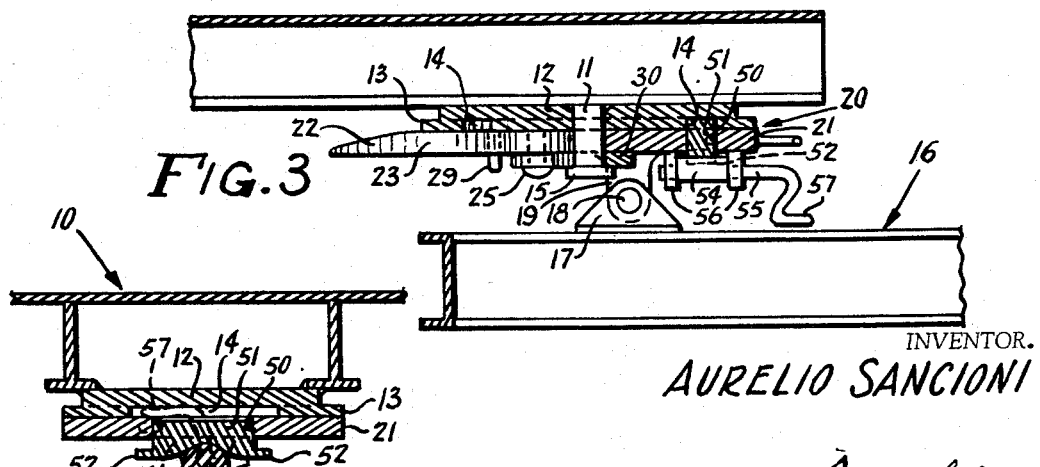
FIG.3
FIG.7
INVENTOR.
AURELIO SANCIONI
BY Kimmel & Crowell
ATTORNEYS.

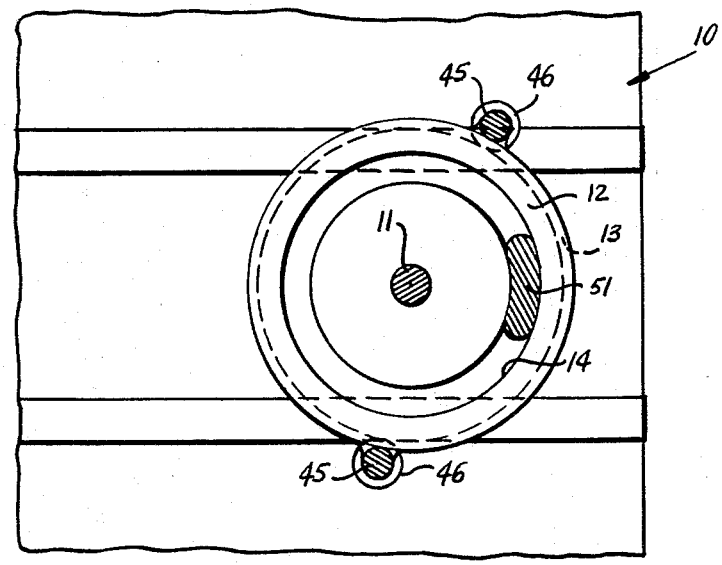
FIG. 4
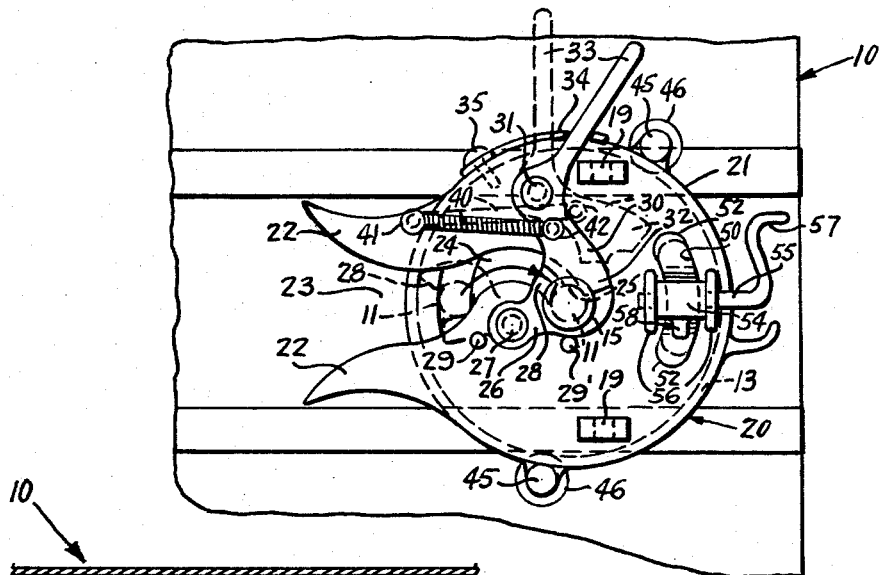
FIG. 5
FIG. 6
INVENTOR.
AURELIO SANCIONI
BY Kimmel & Crowell
ATTORNEYS tion in

United States Patent Office 3,275,340
Patented Sept. 27, 1966

3,275,340
FIFTH WHEEL SAFETY DEVICE
Aurelio Sancioni, Rte. 1, Box 277, Corning, Calif.
Filed Dec. 3, 1964, Ser. No. 415,751
7 Claims. (Cl. 280—432)

This invention relates to a fifth wheel safety device, and has as its primary object the provision of a device adapted to be associated with the conventional fifth wheel of a tractor vehicle and its associated trailer, which will securely hold the components in related assembly even if the king pin shears, or if the pin locking mechanism breaks, or even in the event that both should break at the same time.

An additional object of the invention is the provision of a device of this character which may be readily applied to any existing fifth wheel assembly, and associated trailer, and further which may be readily adapted, when applied to the fifth wheel of a tractor to be utilized with trailers not employing the other components of the device.

An additional object of the invention is the provision of a device of this nature which may be simply and expeditiously locked and unlocked with a minimum of time and effort.

A further object of the invention is the provision of a device of this character wherein the pulling force exerted on the king pin is minimized.

Still another object of the invention is the provision of such a device whereby the arrangement by reducing the pull directly on the king pin reduces jar and vibration, and consequent friction and eventual slack due to wear to a minimum.

A further object of the invention is the provision of a device of this character which is sturdy and durable in construction, reliable and efficient in operation, and relatively simple and inexpensive to manufacture, assemble and utilize.

Other objects will in part be obvious, and in part be pointed out as the description of the invention proceeds and shown in the accompanying drawings wherein there are shown preferred embodiments of this inventive concept.

In the drawings:

FIGURE 1 is a top plan view of the safety device of the instant invention shown as applied to the fifth wheel of a tractor, connected to an associated trailer, the concealed components thereof being indicated by dotted lines;

FIGURE 2 is a side elevational view of the device taken substantially along the line 2—2 of FIGURE 1; as viewed in the direction indicated by the arrows;

FIGURE 3 is a sectional view taken substantially along the line 3—3 of FIGURE 1 as viewed in the direction indicated by the arrows;

FIGURE 4 is a sectional view taken substantially along the line 4—4 of FIGURE 2 as viewed in the direction indicated by the arrows;

FIGURE 5 is a sectional view taken substantially along the line 5—5 of FIGURE 2 as viewed in the direction indicated by the arrows;

FIGURE 6 is a sectional view taken substantially along the line 6—6 of FIGURE 1 as viewed in the direction indicated by the arrows; and FIGURE 7 is a view similar to FIGURE 6 but showing the component parts in a different position of adjustment.

Similar reference characters refer to similiar parts throughout the several views of the drawings.

Having reference now to the drawings in detail there is generally indicated at 10 a fragment of a trailer vehicle, which has depending from the underside thereof a king pin 11, the latter being of substantially conventional design. However, in accordance with the instant invention there is welded, or otherwise secured to the base of the trailer body 10 a circular plate 12, which is provided with an annular flange 13 extending outwardly about the circumference thereof, and which contains a concentric milled groove 14 on its underside, the purpose of which will be more fully described hereinafter. The king pin 11 is provided with the usual enlarged head 15, as best shown in FIGURE 3.

The tractor body, a fragment of which is generally indicated at 16 has a fitting 17 mounted thereon which includes a transverse pivot 18 which pivotally mounts the depending lug 19 of a fifth wheel assembly generally indicated at 20. The fifth wheel assembly 20 comprises a generally disc-shaped member 21 which is provided with a pair of diverging tongues 22 which define therebetween a tapered slot 23 for the reception of the king pin 11. In this particular configuration, however, in contrast to the conventional fifth wheel assembly the inner portion of the slot is arcuate and tortuous as indicated at 24, and terminates in a recess 25 for the reception of the king pin which is aligned longitudinally with the axis of the vehicle, but wherein the pull exerted on the king pin is received primarily by the portion 24 extending into the curved slot.

Locking means are provided for retaining the king pin in position and comprise a first locking member 26 which is pivotally mounted on a pivot 27 on the upper side of disc 21, and which has an arcuate jaw portion 28, which in the unlocked position of the device as shown in dotted lines in FIGURE 5 extends substantially into the center of the slot 23. When the pin 11 engages this jaw it rotates the member 26 about its pivot to the position shown in full lines, and the king pin seats in the semi-circular jaw portion thus provided. Stop pins 29 and 29' limit the movement of the jaw 28 between the two positions of adjustment.

An additional jaw member generally indicated at 30 is pivotally mounted on a pivot 31 on disc 21, and includes a curved jaw portion 32 which is complementary to the jaw portion 28 when the parts are in locking relation, the faces of the jaws being designed to co-act in flush relation to completely encircle the king pin 11. The jaw 30 may be moved to an unlatched or out of the way position as indicated in dotted lines in FIGURE 5, and moved to locking position by means of a handle member 33 which extends laterally of the disc 21. A spring fastener 34 secured as by means of a bolt 35 to the side edge of disc 21, the arrangement being such that when the handle is in a locked position as indicated in full lines the two jaw segments 28 and 32 closely engage about the king pin 11 to hold the same in its socket at the base of the slot.

A spring 40 connected between a pin 41 carried by one of the tongues 22 and a pin 42 carried by jaw 30 normally biases the jaw 30 to open position, when not engaged by the latch or detent 34.

Guide rollers 45 are positioned on opposite sides of disc 21, and are provided with annular flanges 46 which engage over the flange 13, adjacent the disc 12, and serve when the tractor and trailer are being connected to guide the disc 13 into aligned position with the disc 21. The flanges 46 also serve to hold the flange 13 closely adjacent fifth wheel assembly 20.

Disc member 21 is provided with an arcuate slot 50, within which is linearly movable an arcuate block 51, which is movable into and out of engagement with the groove 14, and which, when locked in position in a manner to be described hereinacter serves to hold the parts in related assembly, even in the event that the king pin 11 is sheared or severed, or in the event that either or both of jaws 26 and 30 are broken and rendered inoperative. The block 51 is provided with end flanges 52 and, as best shown in FIGURES 6 and 7, a central depression 53. The central depression is engaged by a cam 54 which is mounted on transverse shaft 55 rotatably mounted between lugs 56 on opposite sides of slot 50, the cam being rotatable by means of a hand crank 57. A projecting lug 58 on one side of the cam limits the rotative movement thereof.

The arrangement is thus such that with the cam and its associated crank in the position shown in FIGURE 7, for example, the block 51 is retracted out of engagement with the groove 14 and the parts may be assembled and disassembled with a minimum of difficulty and effort. However, when the handle 57 is rotated to the position indicated in FIGURE 6 the high dwell of the cam engages in the recess 53 and forces block 51 upwardly in the groove 14, in such manner as to effectually lock the parts in related assembly. The weight of the trailer bearing down on the block 51 serves to preclude rotation of the cam, and in consequence prevents its dislodgement.

By the connection of the block 51 in groove 14 a further safety facility is provided, which positively precludes disengagement of the truck and trailer even though the shear pin, and/or the jaws 26 and 30 break, either independently or simultaneously.

From the foregoing it will now be seen that there is herein provided an improved fifth wheel safety device which accomplishes all of the objects of this invention, and others, including many advantages of great practical utility and commercial importance.

As many embodiments may be made in this inventive concept, and as many modifications may be made in the embodiment hereinbefore shown and described, it is to be understood that all matter herein is to be interpreted merely as illustrative and not in a limiting sense.

I claim:

1. In combination with a tractor carrying a fifth wheel and a trailer having a depending king pin, a safety device comprising an elongated arcuate slot in said fifth wheel whereby the king pin engages against a portion of the side wall of the arcuate slot when a pulling force is exerted by the tractor, a pair of jaw members having complementary semi-circular jaw surfaces engaging around the king pin when closed, pivoted to the upper side of said fifth wheel on opposite sides of said slot, a handle member secured to one of said jaws and means for securing said handle to prevent release of said one jaw, the other jaw being held in locked position by said one jaw.

2. The structure of claim 1 wherein spring means bias said one jaw to closed position.

3. The structure of claim 1 wherein a disc having an annular horizontal flange is secured to said trailer surrounding said king pin, and a pair of guide rollers having flanges overlying said horizontal flange when the tractor and trailer are connected mounted adjacent said fifth wheel.

4. The structure of claim 3 wherein said disc has an annular groove on its underside, and lug means carried by said fifth wheel are movable into and out of groove engaging position.

5. The structure of claim 4 wherein said lug means comprise an arcuate block carried in a slot in said fifth wheel, cam means movable to raise said block into engagement with said groove and means for locking said cam.

6. The structure of claim 5 wherein said cam means comprise an axle mounted transversely between said slot in said fifth wheel, a cam rotatable with said axle and handle means for rotating said axle.

7. The structure of claim 6 wherein a lug extending from said cam limits the movement thereof.

References Cited by the Examiner

UNITED STATES PATENTS

| | | | |
|---|---|---|---|
| 2,166,308 | 7/1939 | Logan | 280—432 |
| 2,400,738 | 5/1946 | Brown | 280—432 |
| 2,450,201 | 9/1948 | Logan | 280—432 |
| 2,673,747 | 3/1954 | Norris | 280—432 |
| 3,117,803 | 1/1964 | Saewert | 280—433 |

LEO FRIAGLIA, *Primary Examiner.*